Dec. 11, 1951   S. M. GRISWOLD ET AL   2,577,750
MATRIX FOR USE IN MAKING WELT INSOLES
Filed May 29, 1948

Inventors
Stanley M. Griswold
Hans C. Paulsen
By their Attorney

Patented Dec. 11, 1951

2,577,750

UNITED STATES PATENT OFFICE 2,577,750

MATRIX FOR USE IN MAKING WELT INSOLES

Stanley M. Griswold, Newton, and Hans C. Paulsen, Medford, Mass., assignors to United Shoe Machinery Corporation, Flemington, N. J., a corporation of New Jersey Application May 29, 1948, Serial No. 30,078

5 Claims. (Cl. 12—20)

This invention relates to matrices for use in making welt insoles.

An object of the invention is to provide an accurate, durable, single-piece matrix for use in producing exactly mated pairs of ribbed insoles.

It has heretofore been proposed to provide matrices or molds having therein grooves of the shape and size of an insole rib and to force canvas into such grooves with a correspondingly sized and shaped patrix. In the use of the present invention, however, canvas is progressively and economically formed into the groove of the matrix and thus the cost of equipment for making insoles is greatly reduced and simplified since no patrices are needed.

The improved matrix comprises an insole-shaped pattern block of suitable material having flat, parallel faces and having in each face a groove corresponding in depth, width and location to the height, thickness and location of the desired rib on the insole. The exact size and shape of the matrix and the location of the grooves with respect to its edge may be determined by the method disclosed in our prior application Serial No. 717,122, filed December 19, 1946, of which this application is a continuation in part relating to the matrix per se.

The matrix may be formed from a block of wood of suitable size, the block being preferably faced on each side with sheet metal, for example aluminum alloy, for the sake of durability of the matrix. The sheet metal is preferably cemented to the block. The block may be made of any suitable material examples of which are given later. The location of each rib groove with respect to the edge of the matrix varies according to a plan determined by the shoemaker. Usually it is farthest from the edge at the shank portion, nearest to the edge along the ball portion, and at an intermediate distance from the edge around the toe, the groove having a gradual and smooth transition from one distance to the other. The thickness of the block is greater than the sum of the depths of the rib grooves, leaving an integral web of material between the grooves. In the edge face of the matrix is a groove the bottom of which is at a uniform distance from each of the rib grooves, the bottom of this groove providing a surface to be used as a gaging abutment in locating the matrix with respect to means for tucking canvas into the groove. Under some conditions it is preferable that the rib of the insole resulting from the use of the matrix have its rib inwardly inclined. Accordingly, for this purpose the parallel walls of the groove in each flat face of the matrix are inwardly inclined toward the center of the matrix, the amount of inclination of the inner wall, for example, being about 25° with respect to a line perpendicular to the adjacent face of the matrix at the outer edge of the wall. The matrix may have pins in the heel-seat portion thereof to prevent shifting of the insole thereon and may be provided with an upstanding tang at the heel end to assist in properly placing the canvas upon it.

Figure 1:
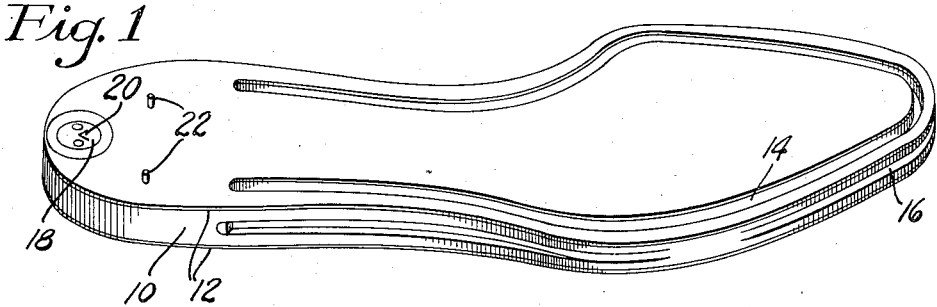
Fig. 1 is a perspective view of the matrix the rib grooves of which are formed perpendicular to its flat face.
Figure 2:
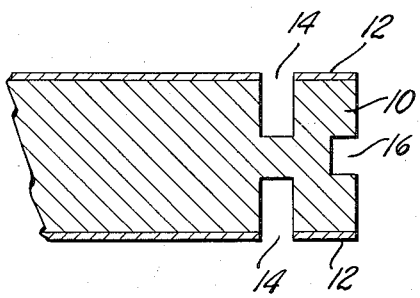
Fig. 2 is an enlarged fragmentary section of the matrix of Fig. 1.

The body portion 10 of the matrix may be of hard wood, hard rubber, formica (fabric impregnated with phenolic condensation product), aluminum or magnesium. If of wood, it may be about five-eighths of an inch in thickness with flat, parallel faces to each of which, for the sake of durability, is cemented a layer of sheet metal 12, the sheet metal being, for example, aluminum alloy about .030 inch in thickness. In each flat face of the matrix is a groove 14 which preferably starts at the breast line and extends along the shank, around the forepart and back to the breast line again, the two grooves occupying about two-third to three-quarters of the thickness of the matrix whereby the part of the matrix located inside of the grooves is integrally connected with the part of the matrix located outside of the grooves. Along the shank each groove is at the greatest distance from the edge of the matrix, along the ball portion at the least distance from the edge, and about the toe at an intermediate distance, the grooves having a smooth and gradual transition from one distance to another, the exact location of the grooves being determined from an insole pattern furnished by the shoe manufacturer. In the center of the edge face of the matrix is a third groove 16 the bottom of which is at a predetermined uniform distance from the rib grooves 14. The depth of this groove is such that it may be entirely removed at the ball portion of the blank and only a vestige of it left about the toe. The guiding surface at the bottom of the groove, however, is not disturbed and forms a gaging abutment. The groove at the heel breast line will remain of its original depth, and the end of the groove, which is at the breast line, is utilized as a stop or abutment to locate the matrix for the beginning of the operation of tucking the canvas into the groove to form a rib. The matrix, as indicated in Fig. 1, may have on each side a plate 18 with an upstanding tang 20 inserted at the heel end to assist in locating the canvas on the matrix and may have pins 22 inserted in the heel portion to prevent lateral shifting of the insole at those portions of the matrix where there is no rib to hold it in place. If desired, the canvas may extend only slightly beyond the breast line, in which case the tang 20 will be located at or forward of the breast line.

Figure 3:
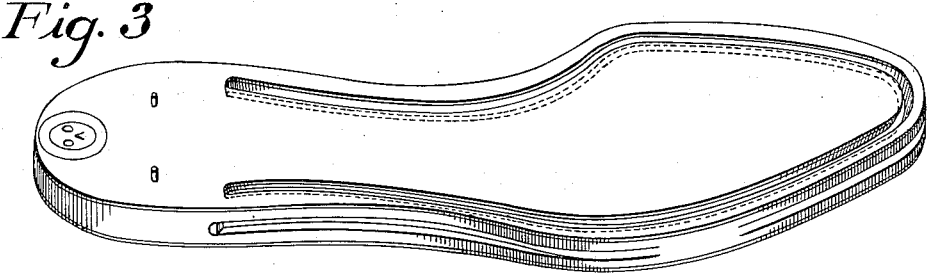
Fig. 3 is a perspective view of a matrix the rib grooves of which are inwardly inclined.
Figure 4:
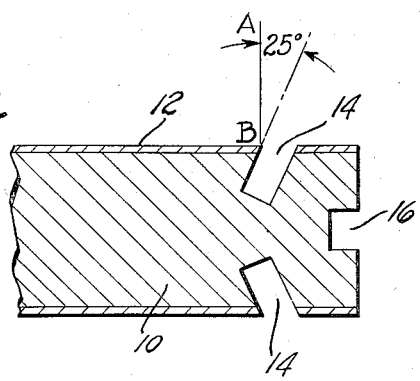
Fig. 4 is an enlarged sectional detail of Fig. 3 showing graphically the amount of inclination of the grooves.

When it is desired that the rib of the insole resulting from the use of the matrix be inwardly inclined, the two grooves 14 of the matrix will be inwardly inclined as illustrated in Figs. 3 and 4. From Fig. 4 it will be seen that the inner wall of either of the rib grooves makes an angle of about 25 degrees with a line A—B perpendicular to a flat face of the matrix at the outer edge of the inner wall.

Having thus described our invention, what we claim as new and desire to secure by Letters Patent of the United States is:

1. A matrix for use in making welt insole pairs comprising a single insole-shaped pattern block having parallel faces in each of which is a groove corresponding in depth, width and location respectively to the height, thickness and location of the insole rib desired, said block having on its edge face a plurality of surfaces one of which is located at a uniform distance from said grooves and forms a gaging abutment.

2. A matrix for use in making welt insole pairs comprising an insole-shaped pattern block having parallel faces each reinforced with sheet metal cemented thereto and each face of said block having formed therein a groove extending through the reinforcing sheet and corresponding respectively in depth, width and location to the height, thickness and location of the ribs on the desired insole pairs, the thickness of the block being greater than the sum of the depths of the said grooves.

3. A matrix for use in making insole pairs comprising a single insole-shaped pattern block parallel faces in each of which is an inwardly inclined groove corresponding in depth, width and location respectively to the height, thickness and location of the insole ribs desired and on the edge face of which is a surface located a uniform distance from said grooves.

4. A matrix for use in making welt insole pairs comprising an insole-shaped pattern block having parallel faces, each face having formed therein a groove corresponding respectively in depth, width and location to the height, thickness and location of the ribs on the desired insole pairs, each of the parallel faces of the block having thereon a metal plate coextensive with said face and having therein a slot coinciding with the groove.

5. A matrix for use in making welt insole pairs comprising a single insole-shaped pattern block having parallel faces in each of which is a groove corresponding in depth, width and location respectively to the height, thickness and location of the insole rib desired, said block having on its edge face a plurality of surfaces, one of which is equidistant from said parallel faces of the block and is located at a uniform distance from said grooves and forms a gaging abutment.

STANLEY M. GRISWOLD.
HANS C. PAULSEN.

REFERENCES CITED

The following references are of record in the file of this patent:

UNITED STATES PATENTS

| Number | Name | Date |
|---|---|---|
| 632,760 | Sleeper | Sept. 12, 1899 |
| 1,173,449 | Mansbach | Feb. 29, 1916 |
| 1,511,555 | Yngve | Oct. 14, 1924 |

FOREIGN PATENTS

| Number | Country | Date |
|---|---|---|
| 750,291 | France | May 22, 1933 |